(12) United States Patent
Loreck et al.

(10) Patent No.: US 9,759,563 B2
(45) Date of Patent: Sep. 12, 2017

(54) VIBRATION ROBUST X-AXIS RING GYRO TRANSDUCER

(75) Inventors: Heinz Loreck, Idstein (DE); Keith L. Kraver, Gilbert, AZ (US); Gary G. Li, Chandler, AZ (US); Yizhen Lin, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 719 days.

(21) Appl. No.: 13/362,873

(22) Filed: Jan. 31, 2012

(65) Prior Publication Data

US 2013/0192363 A1 Aug. 1, 2013

(51) Int. Cl.
*G01C 19/56* (2012.01)
*G01C 19/5733* (2012.01)
*G01C 19/574* (2012.01)

(52) U.S. Cl.
CPC ....... *G01C 19/5733* (2013.01); *G01C 19/574* (2013.01)

(58) Field of Classification Search
CPC ........................ G01C 19/574; G01C 19/5733
USPC ........................................ 73/504.12, 504.14
See application file for complete search history.

(56) References Cited

U.S. PATENT DOCUMENTS

| | | | | |
|---|---|---|---|---|
| 5,869,760 A | * | 2/1999 | Geen | 73/504.12 |
| 6,837,107 B2 | * | 1/2005 | Geen | 73/504.04 |
| 8,616,057 B1 | * | 12/2013 | Mao | G01C 19/574 |
| | | | | 73/504.12 |
| 2004/0211257 A1 | * | 10/2004 | Geen | G01C 19/5712 |
| | | | | 73/504.04 |
| 2005/0183502 A1 | * | 8/2005 | Rodney | G01C 19/5719 |
| | | | | 73/504.02 |
| 2007/0144255 A1 | * | 6/2007 | Handrich et al. | 73/504.12 |
| 2007/0214883 A1 | * | 9/2007 | Durante et al. | 73/504.04 |
| 2008/0202237 A1 | * | 8/2008 | Hammerschmidt | 73/504.04 |
| 2010/0095768 A1 | * | 4/2010 | Acar et al. | 73/504.04 |

FOREIGN PATENT DOCUMENTS

| | | |
|---|---|---|
| CN | 1320207 A | 10/2001 |
| CN | 1954188 A | 4/2007 |
| CN | 101120232 A | 2/2008 |
| CN | 102292616 A | 12/2011 |

OTHER PUBLICATIONS

D.W. Fogliatti, Interconnected Resonant Gyros for Improved Performance, IEEE International Symposium on Circuits and Systems, 2002, pp. IV-289-IV-292, vol. 4.
J. A. Green, Very Low Cost Gyroscopes, Sensors, IEEE, Oct. 30, 2005-Nov. 3, 2005.

* cited by examiner

Primary Examiner — Paul West
Assistant Examiner — Xin Zhong

(57) ABSTRACT

A micro-electromechanical systems (MEMS) transducer (100, 700) is adapted to use lateral axis vibration to generate non-planar oscillations in a pair of teeter-totter sense mass structures (120/140, 720/730) in response to rotational movement of the transducer about the rotation axis (170, 770) with sense electrodes connected to add pickups (e.g., 102/107, 802/807) diagonally from the pair of sense mass structures to cancel out signals associated with rotation vibration.

7 Claims, 5 Drawing Sheets

VIBRATION ROBUST X-AXIS RING GYRO TRANSDUCER

BACKGROUND OF THE INVENTION

Field of the Invention

The present invention is directed in general to the field of Micro-Electro-Mechanical Systems (MEMS). In one aspect, the present invention relates to MEMS inertial sensor devices and methods for operating same.

Description of the Related Art

Micro-Electro-Mechanical Systems technology is increasingly used to integrate mechanical elements, sensors, actuators, and electronics onto very small mechanical structures using conventional batch semiconductor processing techniques. For example, inertial sensors may be formed with MEMS devices on an integrated circuit wafer substrate to form various applications, such as a MEMS gyroscope that is used to detect an angular velocity. However, conventional MEMS gyroscopes have performance limitations that result from various design and manufacturing imperfections.

Accordingly, a need exists for an improved MEMS gyroscope apparatus, system and method of operations that addresses various problems in the art where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
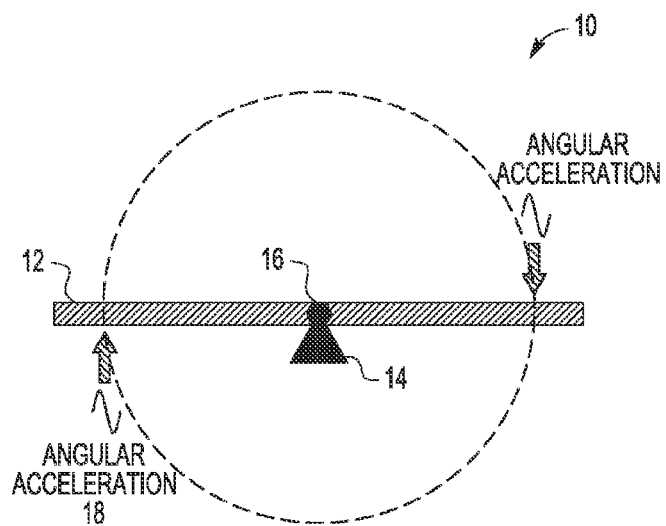
FIG. 1 depicts a simplified schematic side view of a teeter-totter type vibratory gyroscope for sensing rotational acceleration around a rotation axis.

A lateral axis gyroscope sensor and associated methodology of operation are described wherein a pair of symmetric mass transducers is configured to vibrate synchronously in opposition to one another to cancel or reduce detected rotational acceleration or vibration forces, thereby providing vibration robust sensing. Depending on the shape of the vibrating mass transducers, the pair of symmetric mass transducers can measure rotational rate from the detected Coriolis forces while achieving compensation of the injected vibrational torque to make the sensor design robust against variations of the boundary conditions. In selected embodiments, the gyroscope sensor includes a pair of symmetrically designed and synchronized gyro structures, each including a sense element with opposed drive elements. With each gyro structure including a quadrilateral sense mass that is anchored to the substrate by a torsion spring and that is attached to a pair of opposing drive masses via linear springs, the pair of opposing drive masses in the first gyro structure are driven in resonance but opposite phase from the pair of opposing drive masses in the second gyro structure. With this arrangement, any rotational acceleration forces (e.g., from vibration) measured at the pair of symmetrically designed gyro structures are cancelled or suppressed. In other embodiments, the gyroscope sensor includes a pair of symmetrically designed gyro ring structures anchored to the substrate by torsion springs and attached to a shared drive mass which causes the gyro ring structures to vibrate with opposite rotational motion so that any rotational acceleration forces (e.g., from vibration) measured at the pair of symmetrically designed gyro ring structures are cancelled or suppressed.

Various illustrative embodiments of the present invention will now be described in detail with reference to the accompanying figures which illustrate different views of a lateral axis gyroscope sensor system using a pair of synchronized resonant gyro transducer structures to cancel or reduce detected rotational acceleration or vibration. It should be appreciated that the lateral axis gyroscope sensor may be formed with different materials and/or shapes than set forth herein. For the sake of brevity, conventional techniques related to semiconductor processing, MEMS processing, and sensor technology are not described herein. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified plan and cross sectional views of an integrated circuit device without including every device feature or geometry in order to avoid limiting or obscuring the present invention. In addition, circuit details, such as drive and sense signal circuits, have not been explained in any greater extent since such details are well known and not considered necessary to teach one skilled in the art of how to make or use the present invention. Such descriptions and representations are used by those skilled in the art to describe and convey the substance of their work to others skilled in the art.

With conventional MEMS gyroscope sensors, there are performance limitations associated with various non-idealities in both the sensor design and in manufacturing imperfections inevitable in manufacturing. For example, there are performance problems associated with conventional vibratory gyro designs having disc or ring transducer designs which are very sensitive to rotational vibrations close to the drive mass resonance frequency. This sensitivity to vibration noise can erroneously generate false output signals that cannot be differentiated from true angular rate signal. For example, a transducer with injected vibrational torque noise is susceptible to variation of boundary conditions which can negatively affect zero rate stability over temperature and variations of host system PCBs. To reduce the probability of erroneous signals, transducers are typically designed to use high drive mass resonance frequencies to avoid the environmental spectral region of high vibration amplitudes, but this approach cannot be regarded as a solution with automotive safety systems, such as electronic stability program (ESP) applications, which require correct measurements of the vehicle's dynamic behavior.

Figure 2:
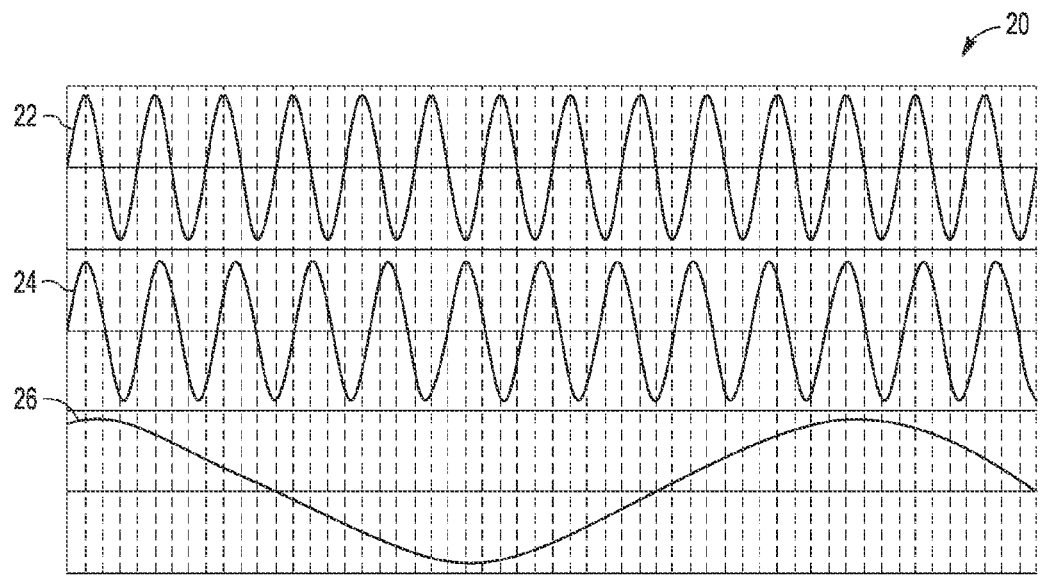
FIG. 2 depicts signal waveforms for the drive mass resonance frequency, injected angular acceleration associated with vibrational noise, and a transducer rate output signal.

To illustrate the challenge posed to gyro transducers by rotational vibration acceleration, reference is now made to FIG. 1 which depicts a simplified schematic side view of a teeter-totter type gyroscope sensor 10. The depicted gyro sensor 10 includes a "teeter-totter" sense mass element 12 which is an active sensing structure whose position in relation to the substrate is detected with substrate capacitor plates formed below the sense mass element (not shown). Connected by lateral springs to a vibrating drive mass structure (not shown), the sense mass element 12 is anchored to the substrate by a torsion spring 14 and configured to undergo rotational motion about a rotational axis 16. In the presence of a fixed rate of rotation, the sensor 10 detects the resulting Coriolis force which is proportional to the rotation rate. However, if rotational vibration creates an angular acceleration 18 around the rotational axis 16 which is close to the resonant frequency of the drive mass structure, the sensor 10 can generate false output signals that cannot be differentiated from valid data. This difficulty is illustrated in FIG. 2 which depicts signal waveforms 20 for a sensor 10 which is not subject to rotational movement. As depicted, the top waveform 22 is the resonance frequency of the vibrating drive mass. In the middle waveform 24, there is shown the injected angular acceleration waveform 24 imposed on the sense mass element 12 from vibrational noise. In cases such as this where the rotational acceleration from vibration is close to the resonance frequency of the drive masses, the rate output signal 26 from the sensor 10 looks like a valid rotational measurement, when in fact there is no rotational movement.

Figure 3:
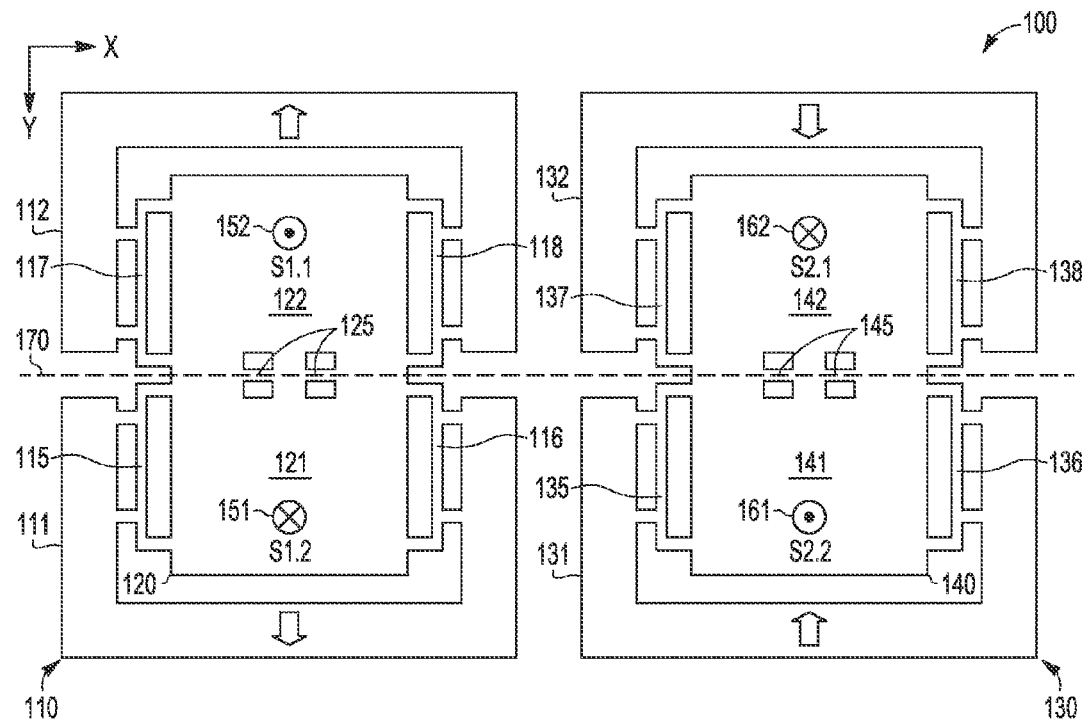
FIG. 3 shows a plan view of a lateral axis MEMS gyroscope sensor using a pair of synchronized resonant gyro structures in accordance with selected embodiments.

FIG. 3 shows a plan view of an example angular rate sensor 100 which is implemented as a MEMS-type vibratory gyroscope (also referred to, in a non-limiting manner, as a "gyroscope," or simply "gyro") in accordance with selected embodiments of the present disclosure. The depicted lateral axis MEMS gyroscope sensor 100 includes a pair of synchronized resonant gyro structures 110, 130 which are formed as a pair of symmetrical or parallel structures disposed in alignment along the rotation axis 170. As used herein, synchronous oscillating motion refers to the synchronized motion of two elements which may be in phase or anti-phase to one another, but which otherwise has motion with the same frequency or period. Each gyro structure includes a pair of drive mass elements 111/112, 131/132 configured to undergo in-plane oscillatory linear motion in a drive direction (e.g., y-axis) about a "teeter-totter" sense mass element 120, 140 that is centered along the rotational axis 170. With this configuration, each sense mass element 120, 140 is configured to undergo rotational motion about a rotational axis 170 in response to rotational movement of the sensor 100 around the in-plane axis 170.

To connect the drive and sense masses, linear link spring components 115-118, 135-138 are configured so that each sense mass is substantially decoupled from its corresponding drive mass elements with respect to the opposed oscillatory linear motion of the drive mass elements, and so that each sense mass is coupled to any out-of-plane oscillatory motion of the drive mass elements 111/112, 131/132. In the example of the first gyro structure 110, link spring components 115-116 connect the drive mass 111 to a first portion 121 of the sense mass 120, while link spring components 117-118 connect the drive mass 112 to a second portion 122 of the sense mass 120 such that the sense mass 120 is decoupled from opposed oscillator linear motion of the drive masses 111, 112 and simultaneously coupled to any out-of-plane oscillatory motion of the drive mass elements 111/112. Of course, it should be understood that a number of flexures, hinges, and other rotational mechanisms may be utilized to enable pivotal movement of sense mass elements 120, 140 about rotational axis 170 in response to the Coriolis effect. Thus, the shape, size, material, and spring constants of the various mechanical linkage springs 115-118, 135-138 may be selected in accordance with known mechanical design principles to achieve the desired sensitivity, stability, and range of x-gyro 100. Indeed, the static and dynamic properties of the gyro device 100 as a whole may be readily specified given the various constituent layers using standard mechanical methods known in the art (e.g., empirical methods, finite-element modeling, closed-form calculations, or the like). In the illustrated embodiment, x-gyro 100 is fabricated using conventional MEMS techniques and materials (e.g., silicon dioxide, single crystal silicon, polysilicon, etc.).

Figure 4:
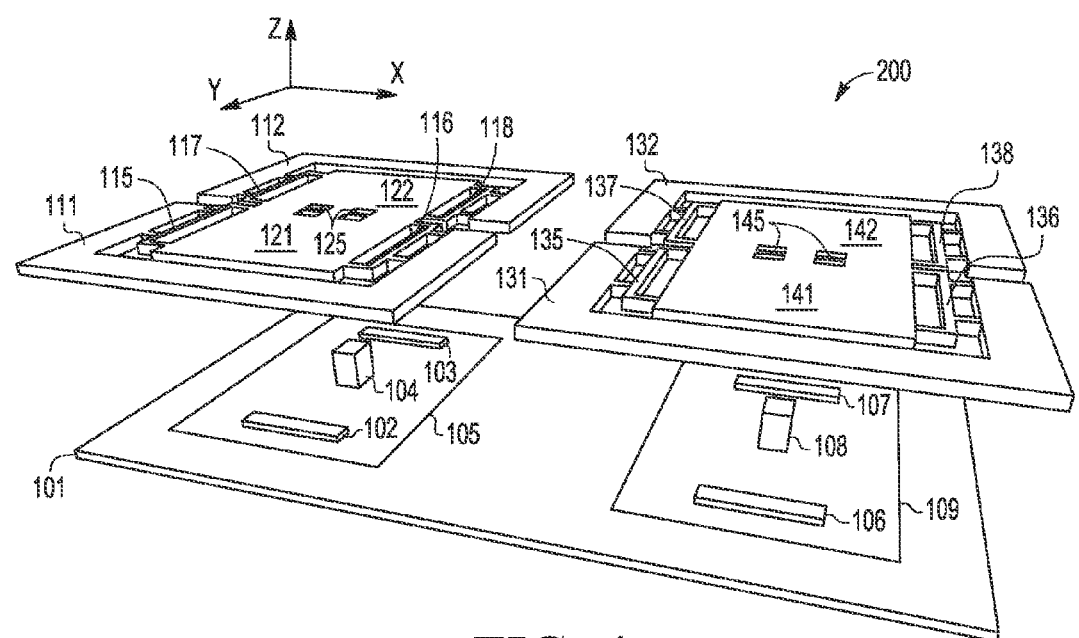
FIG. 4 depicts a perspective view of the lateral axis MEMS gyroscope sensor shown in FIG. 3.

In the example depicted in FIG. 3, the angular rate sensor 100 is an x-gyro device that is generally configured to sense an angular motion about rotational axis 170. By convention, x-gyro 100 is illustrated as having a generally planar structure within the x-y plane (as referenced by the x-y-z reference coordinate lines), wherein the z-axis extends upward and normal to the x-y plane. As shown in FIG. 4's exploded perspective view 200 of the lateral axis MEMS gyroscope sensor shown in FIG. 3, the x-gyro includes a reference frame or substrate structure 101 on which is formed a pair anchor structure structures 104, 108 for supporting the synchronized resonant gyro structures 110, 130. The first gyro structure 110 includes a pair of drive masses 111, 112, a sense mass 120, and various mechanical linkages 115-118 provided therebetween, depending upon the particular embodiment. The second gyro structure 130 is symmetrically disposed on the substrate 101 and includes a pair of drive masses 131, 132, a sense mass 140, and various mechanical linkages 135-138 provided therebetween. With each sense mass 120, 140 constructed as a hinged or teeter-totter proof mass that is framed by opposing pairs of drive masses 111/112, 131/132, the mechanical linkages may include one or more torsional springs or rotational flexures 125, 145 which are connected to the substrate anchors 104, 108 to flexibly suspend the sense mass 120, 140 for pivoting or rotational movement about the rotational axis 170. In addition, the link springs 115-118, 135-138 may be provided as one or more coupling springs that join each pair of opposing drive masses 111/112, 131/132 to the respective sense mass 120, 140. As will be appreciated, the springs 115-118, 135-138 may be any convenient shape that allows opposing motion of the drive masses 111/112, 131/132 along the y-axis and yet is rigid enough to transfer the Coriolis force to the sense masses 120, 140 along the z-axis. Stated another way, the linkage between drive and sensing masses is configured such that each sense mass 120, 140 is relatively unaffected by the in-plane motion of drive masses 111/112, 131/132, but is linked to the drive masses 111/112, 131/132 as they undergo out-of-plane motion (e.g., z-axis motion) during rotation of x-gyro 100.

With this coupling, the drive masses 111/112, 131/132 are configured to undergo opposed oscillatory linear motion within a plane (e.g., an x-y plane), where the direction of this motion may vary, depending upon the embodiment. In each gyro structure 110, 120 the linear vibratory movement of the drive masses may be controlled by applying a drive voltage to drive electrodes (not shown at the ends of the drive masses to produce electrostatic forces that cause the drive masses to move in a linear, oscillating motion. By applying a first time varying voltage drive signal to generate alternating charge at the drive electrodes on opposing ends of the drive masses 111-112, the drive mass 111 moves in the opposite direction from drive mass 112 at all times, thereby oscillating back and forth in a vibratory manner above the reference substrate 101. At the same time, a second complementary time varying voltage drive signal is applied to generate alternating charge at the drive electrodes on opposing ends of the drive masses 131, 132 so that the drive mass 131 moves in the opposite direction from drive mass 132 at all times, thereby oscillating back and forth in a vibratory manner above the reference substrate 101. As a result of applying the first and second complementary time varying voltage drive signals, the first pair of drive mass elements 111-112 has an oscillating motion in the horizontal (e.g., y-axis) direction that is in resonance with, but 180 degrees out of phase with, the oscillating motion of the second pair of drive mass elements 131-132. Though not explicitly shown, there may also be additional coupling springs coupled between the drive masses 111/112, 131/132 which help synchronize the opposed oscillating motion of the drive masses such that the drive masses 111, 132 vibrate synchronously while the drive masses 112, 131 also vibrate synchronously but in opposite phase from the drive masses 111, 132. In this way, the drive masses 111/112 of the first gyro structure 110 move towards the sense mass 120 while the drive masses 131/132 of the second gyro structure 120 are moving outward from the sense mass 140.

In the illustrated embodiment where the rotational axis 170 is in the x-axis direction, the drive masses 111/112, 131/132 undergo oscillatory linear motion that is substantially parallel to the y-axis. When reference substrate 101 experiences a force that generates an angular movement around axis 170, this angular movement is sensed using sense measurement electrodes 102-103, 106-107 formed on the substrate 101 under the sense mass elements 120, 140 (as indicated by shadow lines 105, 109) to sense out-of-plane teeter-totter motion of the sense elements 120, 140. The sense electrodes may be formed by depositing, patterning and etching a static conductive layer on the substrate to form at least two pairs of electrically isolated electrodes or plates 102-103, 106-107, with each pair symmetrically disposed on each side of the rotational axis 170. The electrodes or plates 102-103, 106-107 are connected through one or more conductive via and contact layers (not shown) in the substrate 101 to capacitive signal sense circuitry which evaluates the different capacitance values associated with each electrode/plate 102-103, 106-107. While only two sets of electrode pairs 102-103, 106-107 are shown in FIG. 4 for simplicity of illustration, it will be appreciated that the lateral axis MEMS gyroscope sensor 100 may include a different quantity and/or different configuration of electrode elements.

When Coriolis forces are generated by rotation of the gyro 100, they cause the drive masses 111/112, 131/132 to undergo an oscillatory motion out of the plane (i.e., out of the x-y plane) along the z-axis as a function of the angular rate of x-gyro 100 about rotational axis 170. The z-axis movement of the drive masses 111/112, 131/132 is transferred to the sense mass elements 120, 140 by the link spring components 115-118, 131-138. To sense out-of-plane motion, the reference substrate 101 may include a first pair of sense measurement electrodes 103, 104 which are positioned under the sense mass 120 of the first gyro structure 110, and a second pair of sense measurement electrodes 106, 107 which are positioned under the sense mass 140 of the second gyro structure 120. The sense measurement electrodes 102-103, 106-107 are provided as part of the sensing system to detect and measure the out-of-plane deflection of the sense masses 120, 140 in the sense motion direction (z-axis direction) as a result of gyroscopic movement about the input axis 170. In particular, when drive masses 111/112, 131/132 undergo an oscillatory out-of-plane motion that is transferred to the teeter-totter sense mass elements 120, 140, the position change is sensed by sense measurement electrodes 102-103, 106-107. Though not shown, there may also be additional sense measurement electrodes that are formed above the sense mass elements 120, 140. In whatever configuration, the sense electrodes are positioned and used to detect capacitance changes during operation that are caused by rotational movement of the sense mass elements 120, 140 in relation to the reference substrate 101. The reference substrate may also include force feedback electrodes (not shown) which are used to apply electrostatic forces that cause the sense mass elements 120, 140 to move or oscillate, or otherwise adjust the movement or oscillation of the sense mass elements 120, 140.

Figure 5:
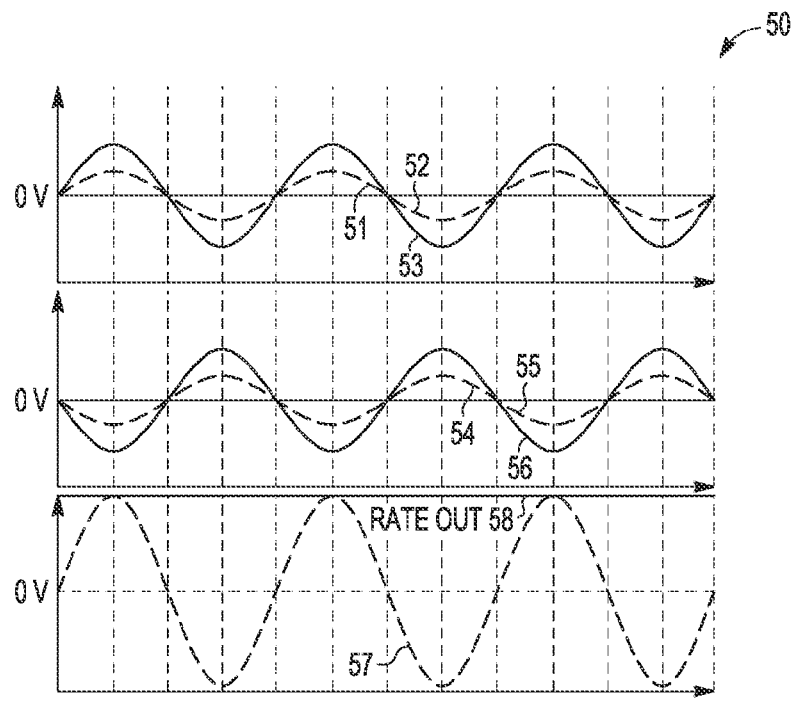
FIG. 5 depicts signal waveforms for the Coriolis forces measured at the pair of synchronized resonant gyro structures in the presence of rotation, along with the generated transducer rate output signal.

In the event that a fixed rotation $\omega$ about axis 170 is applied to the x-gyro 100 (e.g., without rotational acceleration), the resulting Coriolis forces (Fco) cause the sense masses 120, 140 to "teeter-totter" about the rotational axis 170 out of phase with one another. The opposed rotation motion of the sense masses 120, 140 may be measured at the sense nodes 151-152, 161-162 by disposing and connecting the sense measurement electrodes 102-103, 106-107 under the sense mass elements 120, 140 of the resonant gyro structures 110, 130 having synchronized, complementary phase vibratory oscillations. In an example implementation, the capacitive signals at sense electrodes 102 and 107 can be combined to measure 2×Fco (e.g., in the negative z-axis direction) at the sense nodes 151 and 162. Similarly, the capacitive signals at sense electrodes 103 and 106 can be combined to measure −2−Fco (e.g., in the positive z-axis direction) at the sense nodes 152 and 161. To illustrate how the Coriolis forces are measured from the x-axis gyro 100 and combined, reference is now made to FIG. 5 which depicts signal waveforms 50 for the Coriolis forces measured at the pair of synchronized resonant gyro structures 110, 130 in the presence of rotation $\omega$ about axis 170. In the upper graph, the Coriolis forces measured at sense nodes S1.2 151 and S2.1 162 are shown as waveforms 51 and 52, respectively, and the sum of these measured forces (S1.2+

S2.1) is shown as waveform 53. The middle graph shows the Coriolis forces measured at sense nodes S1.1 152 and S2.2 161 at waveforms 54 and 55, respectively, and the sum of these measured forces (S1.1+S2.2) is shown as waveform 56. In the bottom graph, the combined differential signal—(S1.2+S2.1) minus (S1.1+S2.2))—is shown as waveform 57. Signal detection circuitry processes the combined differential signal 57 to generate a demodulated output signal 58 which measures rotation ω about axis 170.

Figure 6:
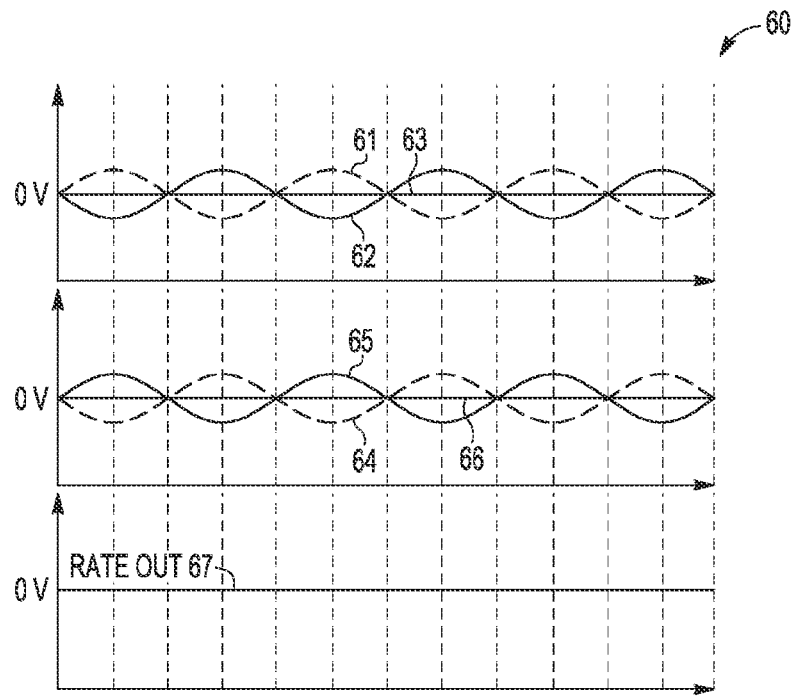
FIG. 6 depicts signal waveforms for the acceleration forces measured at the pair of synchronized resonant gyro structures in the presence of rotational acceleration, along with the generated transducer rate output signal.

In the event that a rotation vibration ω' about axis 170 is applied to the x-gyro 100 (e.g., without fixed rotation ω), the resulting acceleration forces (Fac) cause the sense masses 120, 140 to "teeter-totter" about the rotational axis 170 in phase with one another. When this synchronized rotation motion of the sense masses 120, 140 is measured at the sense nodes 151-152, 161-162, the capacitive signals at sense electrodes 102 and 107 can be combined or added to substantially reduce or eliminate the acceleration forces Fac measured at the sense nodes 151 and 162 since they are opposed to one another. Similarly, the capacitive signals at sense electrodes 103 and 106 can be combined to substantially reduce or eliminate the acceleration forces Fac measured at the sense nodes 152 and 161. To illustrate how the acceleration forces from rotational vibration are cancelled or suppressed, reference is now made to FIG. 6 which depicts signal waveforms 60 for the acceleration forces measured at the pair of synchronized resonant gyro structures 110, 130 in the presence of rotation vibration ω' about axis 170. In the upper graph, the acceleration forces measured at sense nodes S1.2 151 and S2.1 162 are shown as waveforms 61 and 62, respectively, and the cancelling sum of these measured forces (S1.2+S2.1) is shown as waveform 63. The middle graph shows the acceleration forces measured at sense nodes S1.1 152 and S2.2 161 at waveforms 64 and 65, respectively, and the cancelling sum of these measured forces (S1.1+S2.2) is shown as waveform 66. In the bottom graph, the combined differential signal—(S1.2+S2.1) minus (S1.1+S2.2))—effectively cancels the detected acceleration forces, and is processed by signal detection circuitry to generate a demodulated output signal 67 which shows no rotational acceleration about axis 170.

As will be appreciated, the fabrication process used to manufacture the sensor 100 can contribute to imperfections in the gyroscope, such as asymmetric structures and other non-idealities. These imperfections can cause deviations of the center of mass for each sense mass quadrant 121-122, 141-142. With non-aligned centers, the resulting oscillations of the sense mass elements 120, 140 may reduce the ability of the sensor 100 to cancel acceleration forces. But even with typical variations from the fabrication process, the sensor 100 can achieve substantial suppression of vibration noise. Even with typical manufacturing variations, up to 40 dB of vibration disturbance suppression can be achieved for sensors using quadrilateral-shaped sense mass elements.

Figure 7:
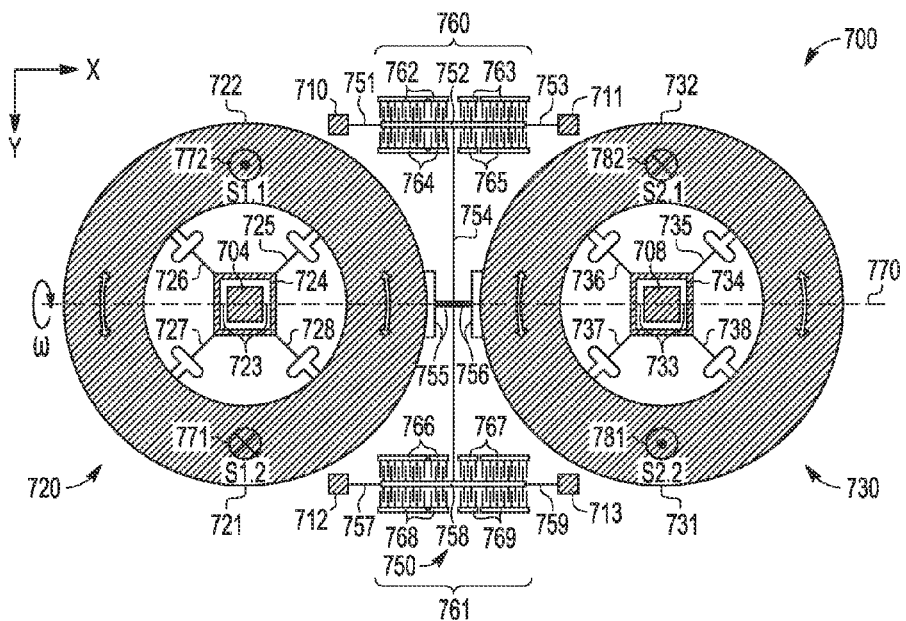
FIG. 7 shows a plan view of a lateral axis MEMS gyroscope sensor using a pair of synchronized resonant gyro ring structures in accordance with selected embodiments.

To improve the vibration noise cancellation function, other structural configurations may be used for the gyro synchronized resonant gyro structures. For example, FIG. 7 shows a plan view of a lateral axis MEMS gyroscope sensor 700 which uses a pair of synchronized resonant gyro ring structures 720, 730 that are each rotationally anchored about its respective center to the substrate, and that are simultaneously driven to synchronously rotate in opposite directions by a shared drive or drive mechanism 750. The depicted lateral axis MEMS gyroscope sensor 700 includes a pair of synchronized resonant gyro ring structures 720, 730 which are formed as a pair of symmetrical rings disposed in alignment along the rotation axis 770. Each gyro ring structure 720, 730 is centered along the rotational axis 770 and connected to the substrate anchor structures 704, 708 by one or more spring component structures 723-728, 733-738 so as to undergo in-plane oscillatory rotational motion in a drive direction (e.g., rotating about a z-axis), and to undergo rotational motion about rotational axis 770 in response to rotational movement of the sensor 700 around the in-plane axis 770.

In selected embodiments, the drive mechanism 750 may be provided as an H-shaped drive mass using drive mass elements 752, 754, 758 which are connected together and to the underlying substrate anchors 710-713 by linear spring elements 751, 753, 757, 759, respectively. In addition, central x-axis springs 755, 756 couple the shared drive mechanism 750 to the ring-shaped sense mass structures 720, 730 an as to permit opposed oscillating rotation of the ring-shaped sense mass structures 720, 730. Together, the spring elements 751, 753, 757, 759, 755-756 are designed to provide oscillating linear motion for the drive mechanism 750 along the y-axis. The linear motion is created by positioning opposing drive electrodes 762-765, 766-769 on opposite ends of the drive mechanism 750. By applying the appropriate electrical drive signal to the drive electrodes 762-765, 766-769, the shared drive mechanism 750 undergoes oscillatory linear motion within the x-y plane. For example, linear y-axis motion may be imparted to the drive mechanism 750 using electrical conductors or comb teeth 760, 761 formed adjacent to opposite sides of the drive mechanism 750 and driven by drive signals. And as shown in FIG. 7, each anchored side of the H-shaped drive mechanism 750 may include electrical conductors or comb teeth which are positioned to be driven by electrical conductors or comb teeth formed in the drive electrode(s). As will be appreciated other structural configurations for the drive mechanism 750 may be used, such as T-shaped or I-shaped drive mass elements. In addition, one or more of the drive electrodes 762-765, 766-769 may be used to sense the drive motion.

In response to the linear motion of the drive mechanism 750, the resonant gyro ring structures 720, 730 are driven into counter directional rotational vibration around their respective center z-axes by virtue of being connected to substrate anchor structures 704, 708 by one or more spring component structures 723-728, 733-738. As will be appreciated, the spring component structures 723-728, 733-738 may be any convenient shape or configuration that allows counter rotational motion of the ring-shaped sense mass structures 720, 730 around their respective center z-axis, and yet is rigid enough to transfer the Coriolis force to the ring-shaped sense mass structures 720, 730 for teeter-totter rotation around the x-axis. Stated another way, the linkage between drive and ring-shaped sense masses is configured such that the sense masses 720, 730 undergo in-plane counter rotation in response to the in-plane motion of the drive mechanism 750, and undergo out-of-plane teeter-totter motion during rotation of x-gyro 700 about the rotation axis 770. In any case, it will be understood that a number of flexures, hinges, and other rotational mechanisms may be utilized to enable pivotal movement of ring-shaped sense mass structures 720, 730 about rotational axis 770 in response to the Coriolis effect. In an example configuration, the first gyro ring structure 720 is connected to an internal frame member 724 by one or more symmetrically arranged linear spring elements 725-728. In turn, the internal frame member 724 is connected to the substrate anchor structure 704 by one or more torsional springs or rotational flexures 723 which are connected to the substrate anchor 704 to flexibly suspend the gyro ring structure for pivoting or rotational movement about the rotational axis 770. Likewise, the second gyro ring structure 730 may be connected to an internal frame member 734 by one or more symmetrically arranged linear spring elements 735-738, with the internal frame member 734, in turn, being connected to the substrate anchor structure 708 by one or more torsional springs or rotational flexures 733 for flexibly suspending the gyro ring structure 730 for pivoting or rotational movement about the rotational axis 770.

With the depicted lateral axis MEMS gyroscope sensor 700, the resonance frequency of the drive mechanism 750 is mainly defined by the linear spring constant and the mass of the ring structures 720, 730. By symmetrically disposing both gyro ring structures 720, 730 to be coupled to the common drive mechanism 750, the pair of resonant gyro ring structures 720, 730 achieve counter rotation having equal amplitude and complementary phase. And by anchoring each gyro ring structure 720, 730 using torsional springs or rotational flexures 723, 733, each gyro ring structure 720, 730 may enter a secondary or sense resonance mode around the rotation axis 770. This "sense resonance" is defined by the spring constant of the torsion springs 723, 733 and the associated mass of the ring structures 720, 730, and should be close or equal to the drive frequency for closed loop systems.

Figure 8:
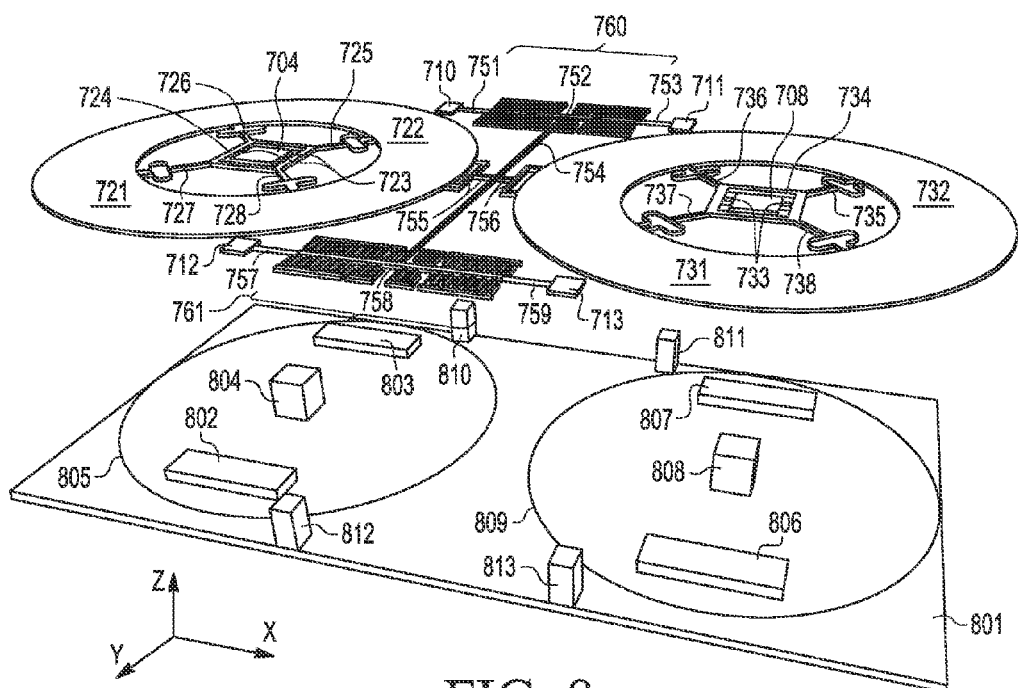
FIG. 8 depicts a perspective view of the lateral axis MEMS gyroscope sensor shown in FIG. 7.

In the illustrated embodiment where the rotational axis 770 is in the x-axis direction, the ring-shaped sense mass structures 720, 730 undergo oscillating counter rotational motion that is substantially parallel to the x-y plane. As shown in FIG. 8's exploded perspective view 800 of the lateral axis MEMS gyroscope sensor shown in FIG. 7, the x-gyro includes a reference frame or substrate structure 801 on which is formed a pair of anchor structures 804, 808 for supporting the ring-shaped sense mass structures 720, 730. In addition, drive mass anchor structures 810-813 are formed on the substrate 801 for supporting the drive mechanism 750. When reference substrate 801 experiences a force that generates an angular movement around axis 770, this angular movement is sensed using sense measurement electrodes 802-803, 806-807 formed on the substrate 801 under the ring-shaped sense mass structures 720, 730 (as indicated by shadow lines 805, 809) to sense out-of-plane teeter-totter motion of the ring-shaped sense mass structures 720, 730. In particular, Coriolis forces cause the counter rotating ring-shaped sense mass structures 720, 730 to undergo an oscillatory motion out of the plane (i.e., of the x-y plane) along the z-axis as a function of the angular rate of x-gyro 700 about rotational axis 770. To sense out-of-plane motion, the reference substrate 801 may include a first pair of sense measurement electrodes 803, 804 disposed under the ring-shaped sense mass 720, and a second pair of sense measurement electrodes 806, 807 disposed under the ring-shaped sense mass 730. The sense measurement electrodes 802-803, 806-807 are provided as part of the sensing system to detect and measure the out-of-plane deflection of the ring-shaped sense masses 720, 730 in the sense motion direction (z-axis direction) as a result of gyroscopic movement about the input axis 770. Though not shown, there may also be additional sense measurement electrodes that are formed above the ring-shaped sense masses 720, 730. In whatever configuration, the sense electrodes are positioned and used to detect capacitance changes during operation that are caused by rotational movement of the ring-shaped sense masses 720, 730 in relation to the reference substrate 801.

In the event that a fixed rotation ω about axis 770 is applied to the x-gyro 700 (e.g., without rotational acceleration), Coriolis forces (Fco) are generated which cause the ring-shaped sense masses 720, 730 to "teeter-totter" about the rotational axis 770 out of phase with one another. In this out of phase rotation, opposed portions 721, 732 of the ring-shaped sense masses 720, 730 move up and down together, while opposed portions 722, 731 of the ring-shaped sense masses 720, 730 simultaneously move down and up together. The opposed rotation motion of the ring-shaped sense masses 720, 730 may be measured at the sense nodes 771-772, 781-782 by disposing and connecting the sense measurement electrodes 802-803, 806-807 under the resonant gyro ring structures 720, 730 having synchronized, counter rotating oscillations. In an example implementation, the capacitive signals at sense electrodes 802 and 807 can be combined to measure 2×Fco (e.g., in the negative z-axis direction) at the sense nodes 771 and 782. Similarly, the capacitive signals at sense electrodes 803 and 806 can be combined to measure −2×Fco (e.g., in the positive z-axis direction) at the sense nodes 772 and 781.

Figure 9:
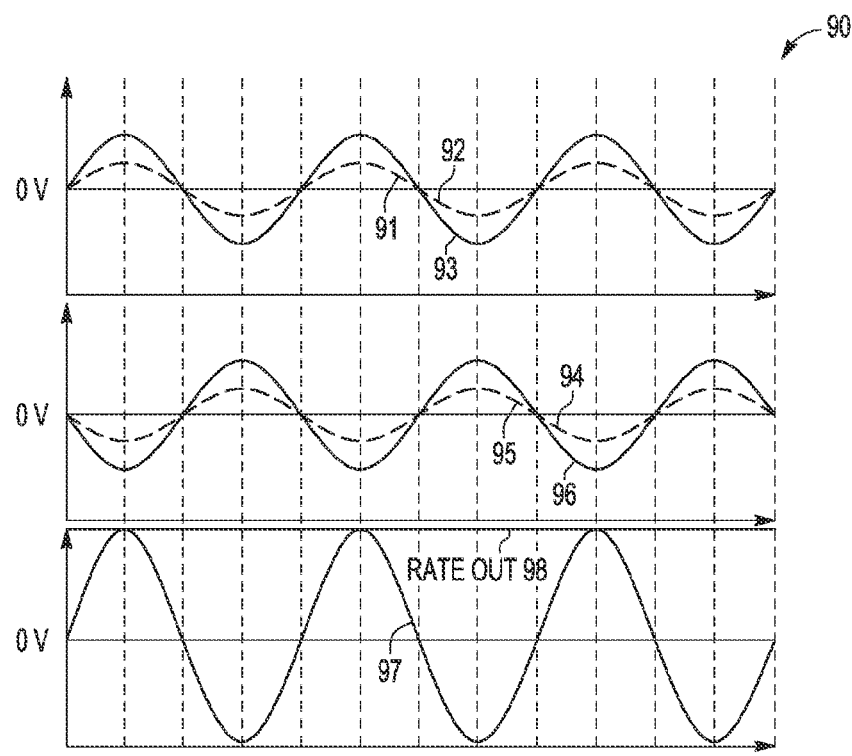
FIG. 9 depicts signal waveforms for the Coriolis forces measured at the pair of synchronized resonant gyro ring structures in the presence of rotation, along with the generated transducer rate output signal.

To illustrate how the Coriolis forces are measured from the x-axis gyro 700 and combined, reference is now made to FIG. 9 which depicts signal waveforms 90 for the Coriolis forces measured at the pair of synchronized resonant gyro ring structures 720, 730 in the presence of rotation ω about axis 770. In the upper graph, the Coriolis forces measured at sense nodes S1.2 771 and S2.1 782 are shown as waveforms 91 and 92, respectively, and the sum of these measured forces (S1.2+S2.1) is shown as waveform 93. The middle graph shows the Coriolis forces measured at sense nodes S1.1 772 and S2.2 781 at waveforms 94 and 95, respectively, and the sum of these measured forces (S1.1+S2.2) is shown as waveform 96. In the bottom graph, the combined differential signal—(S1.2+S2.1) minus (S1.1+S2.2))—is shown as waveform 97. Signal detection circuitry processes the combined differential signal 97 to generate a demodulated output signal 98 which measures the rotation ω about axis 770.

Figure 10:
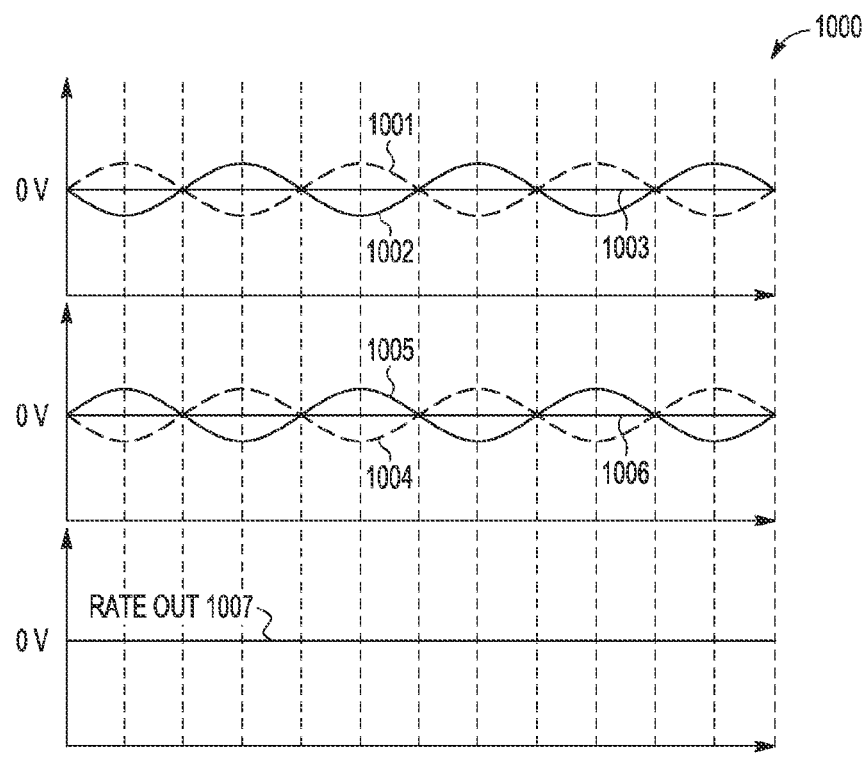
FIG. 10 depicts signal waveforms for the acceleration forces measured at the pair of synchronized resonant gyro ring structures in the presence of rotational acceleration, along with the generated transducer rate output signal.

In the event that a rotation vibration ω' is applied about rotation axis 770 of the x-gyro 700 (e.g., without fixed rotation ω), the resulting acceleration forces (Fac) cause the counter rotating gyro ring structures 720, 730 to "teeter-totter" about the rotational axis 770 in phase with one another. When this synchronized rotation motion of the gyro ring structures 720, 730, adjacent portions 721, 731 of the ring-shaped sense masses 720, 730 on one side of the axis 770 move up and down together, while adjacent portions 722, 732 of the ring-shaped sense masses 720, 730 on the other side of the axis 770 simultaneously move down and up together. When this synchronized rotation motion of the gyro ring structures 720, 730 is measured at the sense nodes 771-772, 781-782, the capacitive signals captured at sense electrodes 802 and 807 can be combined or added to substantially reduce or eliminate the acceleration forces Fac measured at the sense nodes 771 and 782 since they are opposed to one another. Similarly, the capacitive signals captured at sense electrodes 803 and 806 can be combined to substantially reduce or eliminate the acceleration forces Fac measured at the sense nodes 722 and 731. To illustrate how the acceleration forces from rotational vibration are cancelled or suppressed, reference is now made to FIG. 10 which depicts signal waveforms 1000 for the acceleration forces measured at the pair of synchronized resonant gyro ring structures 720, 730 in the presence of rotation vibration ω' about axis 770. In the upper graph, the acceleration forces measured at sense nodes S1.2 771 and S2.1 782 are shown as waveforms 1001 and 1002, respectively, and the cancelling sum of these measured forces (S1.2+S2.1) is shown as waveform 1003. The middle graph shows the acceleration forces measured at sense nodes S1.1 772 and S2.2 781 at waveforms 1004 and 1005, respectively, and the cancelling sum of these measured forces (S1.1+S2.2) is shown as waveform 1006. In the bottom graph, the combined differential signal—(S1.2+S2.1) minus (S1.1+S2.2))—effectively cancels the detected acceleration forces, and is processed by signal detection circuitry to generate a demodulated output signal 1007 which shows no rotational acceleration about axis 770.

As seen from the foregoing embodiments, a lateral axis MEMS gyroscope sensor is provided in which a pair of single, two-mass sensors which each include mechanically decoupled drive and sense masses which employ symmetric designs to suppress undesired modes, including a symmetric teeter-totter sense mass structure for sensing rotational acceleration around the rotational axis that is detected as a capacitive difference signal by capacitive electrodes below the symmetric sense mass structure. According to selected embodiments, the disclosed lateral axis MEMS gyroscope sensor detection device is fabricated by forming the drive and sense masses using only a single processing mask set. In selected embodiments where the gyro sensor includes a pair of symmetric mass transducers which are configured and driven to vibrate synchronously in opposition to one another, rotational motion can be detected while simultaneously cancelling or reducing detected rotational acceleration or vibration forces, thereby providing vibration robust sensing. The symmetric mass transducers may be implemented with a pair of quadrilateral sense masses that are each anchored to the substrate by a torsion spring and that are attached to a pair of opposing drive masses via linear springs so that any rotational acceleration forces (e.g., from vibration) measured at the pair of symmetrically designed gyro structures are cancelled or suppressed. In other embodiments, the gyroscope sensor includes a pair of symmetrically designed gyro ring structures anchored to the substrate by torsion springs and attached to a shared drive mass which causes the gyro ring structures to vibrate with opposite rotational motion so that any rotational acceleration forces (e.g., from vibration) measured at the pair of symmetrically designed gyro ring structures are cancelled or suppressed.

By now, it should be appreciated that there has been provided herein a vibration-robust lateral axis MEMS sensor for measuring rotational motion about a center line axis and associated method of operation. The disclosed sensor includes a substrate having first and second electrode pairs symmetrically positioned in relation to a center line axis. In addition, first and second gyro sensors are provided which are symmetrically disposed along the center line axis and positioned in spaced apart relationship above a surface of the substrate. The gyro sensors include masses that synchronously oscillate in opposite phase such that, for example, the masses have driven oscillating motions that are substantially 180 degrees out of phase with one another. For example, the gyro sensors may include first and second sense mass elements positioned over the first and second electrode pairs, respectively, where the sense mass elements are adapted to synchronously oscillate in phase together around the center line axis in response to rotational acceleration of the sensor around the center line axis, and to synchronously oscillate anti-phase to one another around the center line axis in response to rotational velocity of the sensor around the center line axis. In selected embodiments, the gyro sensors include a pair of drive masses formed in a first layer and symmetrically disposed in relation to the center line axis, where the pair of drive masses are coupled by a spring system to a corresponding symmetric sense mass element which is also formed in the first layer and undergoes oscillatory out of the plane motion in response to angular rotation of the sensor around the center line axis. For example, each symmetric sense mass element may be a quadrilateral-shaped sense mass which is coupled by one or more torsional springs and an anchor system to the substrate to undergo teeter-totter rotation about the center line axis in response to angular rotation of the sensor around the center line axis. In other embodiments, the gyro sensors include a pair of circular sense mass structures formed in a first layer and symmetrically disposed along the center line axis, where the pair of circular sense mass structures are coupled by a spring system to a drive which imparts counter rotational oscillating in-plane motion to the pair of circular sense mass structures so that the pair of circular sense mass structures undergo oscillatory out of the plane motion in response to angular rotation of the sensor around the center line axis. For example, each circular sense mass structure may be a ring-shaped sense mass structure coupled by one or more springs and an anchor system to the substrate to undergo teeter-totter rotation about the center line axis in response to angular rotation of the sensor around the center line axis. By connecting the first and second electrode pairs to add a first capacitive signal captured at a first electrode positioned under a gyro sensor on one side of the center line axis to a second capacitive signal captured at a second electrode positioned under the gyro sensor on the other side of the center line axis, the first and second capacitive signals associated with rotational acceleration of the sensor around the center line axis substantially cancel one another.

In another form, there is provided a vibration robust lateral axis sensor having first and second symmetric mass transducers formed in a single layer over a substrate. Over the substrate, first and second symmetric mass transducers are symmetrically disposed side-by-side along the center line axis and configured for synchronous in-plane oscillation in opposition to one another. As formed, the first and second symmetric mass transducers are adapted for co-rotational motion relative to the center line axis in response to rotational motion of the sensor around the center line axis, and are adapted for counter rotational motion relative to the center line axis in response to a rotational acceleration force around the center line axis. On the substrate, first and second electrode pairs are symmetrically positioned to detect rotational motion of the sensor by substantially cancelling any rotational acceleration force detected at the first and second electrode pairs. In selected embodiments, the electrode pairs include a first electrode pair formed with first electrode disposed beneath the first symmetric mass transducer on a first side of the center line axis and a second electrode disposed beneath the second symmetric mass transducer on a second, opposite side of the center line axis; and a second electrode pair formed with a third electrode disposed beneath the second symmetric mass transducer on the first side of the center line axis and a fourth electrode disposed beneath the first symmetric mass transducer on the second, opposite side of the center line axis. The symmetric mass transducers may each include first and second masses driven into synchronous linear or rotational in-plane oscillation in opposite phase from one another, and may also include symmetric sense mass element formed in a first layer and symmetrically disposed in relation to the center line axis, where the symmetric sense mass element is adapted to undergo oscillatory out of the plane motion in response to angular rotation of the sensor around the center line axis. In selected embodiments, the symmetric mass transducers include a pair of drive masses formed in the first layer and symmetrically disposed in relation to the center line axis, where each pair of drive masses is coupled to impart linear in-plane oscillation to a corresponding symmetric quadrilateral-shaped sense mass structure. In other embodiments, the symmetric mass transducers include a drive mechanism coupled to impart synchronous in-plane rotational oscillation motion to the first and second symmetric ring-shaped sense mass structure to oscillate in opposite phase from one another.

In yet another form, there is provided a vibrationally-robust method of sensing rotational motion of a lateral axis sensor about a rotational sense axis. In the disclosed method, synchronous in-plane oscillatory motion is imparted to first and second symmetric mass transducers that are symmetrically disposed side-by-side along the rotational sense axis so that the first and second symmetric mass transducers oscillate in opposition to one another. In selected embodiments, synchronous in-plane oscillatory motion is imparted to each of the first and second symmetric mass transducers by driving a pair of drive masses into linear in-plane synchronous anti-phase oscillating motion, where the pair of drive masses are symmetrically disposed on opposite ends of a sense mass element. In other embodiments, synchronous in-plane oscillatory motion is imparted by driving a pair of ring-shaped sense mass structures into rotational in-plane synchronous anti-phase oscillating motion. With the symmetric mass transducers oscillating in opposition to one another, first and second electrode pairs are used to measure rotational motion of the lateral axis sensor about the rotational sense axis by positioning the electrode pairs under the first and second symmetric mass transducers to be symmetrically positioned in relation to a rotational sense axis. In this way, the first and second symmetric mass transducers are adapted for co-rotational motion relative to the rotational sense axis in response to rotational motion of the sensor around the rotational sense axis, and are adapted for counter rotational motion relative to the rotational sense axis in response to a rotational acceleration force around the rotational sense axis. Rotational motion is measured by diagonally adding pickup signals from the first and second electrode pairs such that rotational vibration around the rotational sense axis is cancelled out. The rotational motion may be measured by adding first and second capacitive signals associated with rotational acceleration of the lateral axis sensor around the rotational sense axis substantially cancel one another, where the first capacitive signal is captured at a first electrode positioned under the first symmetric mass transducer on one side of the rotational sense axis, and where the second capacitive signal is captured at a second electrode positioned under the second symmetric mass transducer on the other side of the rotational sense axis.

Although the described exemplary embodiments disclosed herein are directed to various lateral axis MEMS gyroscope sensor structures and methods for making same, the present invention is not necessarily limited to the example embodiments which illustrate inventive aspects of the present invention that are applicable to a wide variety of MEMS sensor devices, manufacturing methods and operational methodologies. While the disclosed MEMS devices may be implemented as a gyroscope, the fabrication process described herein is not limited to gyroscopes or any other type of sensor, but is also applicable to any one of numerous MEMS devices that include some type of structure that is movably suspended by one or more springs and that is formed by bonding an active wafer to a reference wafer. Non-limiting examples of such devices include various types of accelerometers and switches, optical MEMS system components, and other MEMS system devices that use drive and sense electrodes. Thus, the particular embodiments disclosed above are illustrative only and should not be taken as limitations upon the present invention, as the invention may be modified and practiced in different but equivalent manners apparent to those skilled in the art having the benefit of the teachings herein. For example, the methodology of the present invention may be applied using drive mass and sense mass structures other than expressly set forth herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of sensing angular rotation of a lateral axis sensor about a rotational sense axis, comprising:
   imparting synchronous in-plane oscillatory motion to first and second symmetric mass transducers symmetrically connected side-by-side along the rotational sense axis by a shared drive mechanism which is directly connected in common to the first and second symmetric mass transducers to induce counter rotational motion in the first and second symmetric mass transducers and which oscillates in a linear direction that is perpendicular to the rotational sense axis so that the first and second symmetric mass transducers oscillate in opposition to one another;
   measuring a rate of angular rotation of the lateral axis sensor about the rotational sense axis using first and second electrode pairs positioned under the first and second symmetric mass transducers and symmetrically positioned in relation to a rotational sense axis, where the first and second symmetric mass transducers are adapted for counter rotational motion relative to the rotational sense axis in response to angular rotation of the sensor around the rotational sense axis, and are adapted for co-rotational motion relative to the rotational sense axis in response to an angular acceleration force around the rotational sense axis, so that the angular acceleration force measured at the first and second symmetric mass transducers is cancelled or suppressed.

2. The method of claim 1, where measuring the rate of angular rotation comprises combining a first pickup signal from a first electrode in the first electrode pair with a second pickup signal from a second electrode in the second electrode pair, where the first and second electrodes are positioned on opposite sides of the rotational sense axis, such that rotational vibration around the rotational sense axis is cancelled out.

3. The method of claim 1, where measuring the rate of angular rotation comprises adding first and second capacitive signals associated with angular acceleration of the lateral axis sensor around the rotational sense axis substantially cancel one another, where the first capacitive signal is captured at a first electrode positioned under the first symmetric mass transducer on one side of the rotational sense axis, and where the second capacitive signal is captured at a second electrode positioned under the second symmetric mass transducer on the other side of the rotational sense axis.

4. The method of claim 1, where imparting synchronous in-plane oscillatory motion comprises imparting linear in-plane oscillating motion to the shared drive mechanism connected between the first and second symmetric mass transducers.

5. The method of claim 1, where imparting synchronous in-plane oscillatory motion comprises driving a pair of ring-shaped sense mass structures into rotational in-plane synchronous anti-phase oscillating motion.

6. A method of sensing angular rotation of a lateral axis sensor about a rotational sense axis, comprising:
  imparting oscillating in-plane linear motion to a shared drive mechanism that is directly connected between first and second symmetric mass transducers to drive the first and second symmetric mass transducers into counter rotational oscillatory motion about respective rotation axes which are perpendicular to the rotation sense axis;
  measuring a rate of angular rotation of the lateral axis sensor about the rotational sense axis using first and second electrode pairs positioned under the first and second symmetric mass transducers and symmetrically positioned in relation to a rotational sense axis, where the first and second symmetric mass transducers are adapted for counter rotational motion relative to the rotational sense axis in response to angular rotation of the sensor around the rotational sense axis, and are adapted for co-rotational motion relative to the rotational sense axis in response to an angular acceleration force around the rotational sense axis, so that the angular acceleration force measured at the first and second symmetric mass transducers is cancelled or suppressed.

7. A method of sensing angular rotation of a lateral axis sensor about a rotational sense axis, comprising:
  imparting synchronous counter rotational in-plane oscillatory motion to first and second symmetric mass transducers symmetrically connected side-by-side along the rotational sense axis by driving a shared drive mechanism to oscillate in a linear direction that is perpendicular to the rotational sense axis, where the shared drive mechanism connects the first and second symmetric mass transducers to impart synchronous counter rotational in-plane oscillatory motion to the first and second symmetric mass transducers and to resist anti-phase linear movement of the first and second symmetric mass transducers;
  measuring a rate of angular rotation of the lateral axis sensor about the rotational sense axis using first and second electrode pairs positioned under the first and second symmetric mass transducers and symmetrically positioned in relation to a rotational sense axis, where the first and second symmetric mass transducers are adapted for counter rotational motion relative to the rotational sense axis in response to angular rotation of the sensor around the rotational sense axis, and are adapted for co-rotational motion relative to the rotational sense axis in response to an angular acceleration force around the rotational sense axis, so that the angular acceleration force measured at the first and second symmetric mass transducers is cancelled or suppressed.

* * * * *